United States Patent

Knoll et al.

[11] Patent Number: 5,842,738
[45] Date of Patent: Dec. 1, 1998

[54] HEADREST FOR A VEHICLE SEAT

[75] Inventors: Heinz Knoll, Stuttgart; Rolf Mitschelen, Kirchheim/Teck; Martin Steiner, Grafenau, all of Germany

[73] Assignee: Mercedes-Benz AG, Stuttgart, Germany

[21] Appl. No.: 764,084

[22] Filed: Dec. 6, 1996

[30] Foreign Application Priority Data

Dec. 22, 1995 [DE] Germany ................. 195 48 339.1

[51] Int. Cl.$^6$ ..................................................... B60N 2/48
[52] U.S. Cl. ...................................... 297/216.12; 297/408
[58] Field of Search .................... 297/216.2, 408; 280/730.1

[56] References Cited

U.S. PATENT DOCUMENTS

| | | | |
|---|---|---|---|
| 3,779,577 | 12/1973 | Wilfert | 280/730.1 |
| 3,838,870 | 10/1974 | Hug | 297/216.12 X |
| 4,720,146 | 1/1988 | Mawbey et al. | 297/408 X |
| 4,865,388 | 9/1989 | Nemoto | 297/408 X |
| 5,082,326 | 1/1992 | Sehido et al. | 297/408 X |

FOREIGN PATENT DOCUMENTS

| | | | |
|---|---|---|---|
| 2152202 | 4/1973 | Germany | 297/216.12 |
| 2232726 | 1/1974 | Germany | 297/216.12 |
| 3131633 | 2/1983 | Germany | 297/216.12 |
| 3900495A1 | 7/1990 | Germany. | |
| 29504287.7 | 6/1995 | Germany. | |
| 91167/84 | 6/1984 | Japan. | |
| 88559/86 | 6/1986 | Japan. | |
| 28246/93 | 4/1993 | Japan. | |

*Primary Examiner*—Peter R. Brown
*Attorney, Agent, or Firm*—Evenson, McKeown, Edwards & Lenahan P.L.L.C.

[57] ABSTRACT

A headrest for a vehicle seat is provided with a supporting loop and a head cushion mounted thereon and pivotable in a direction of a seat bottom. An adjusting device activated in the event of a collision is provided for displacing the head cushion relative to the supporting loop in such fashion that the head cushion directly abuts the nape of the neck and the back of the seat occupant's head. To improve head support comfort by provision for individual adjustment of the head support contour to the needs of the seat occupant when asleep, the adjusting device is additionally equipped with a manual operating member that permits changing the setting of the head cushion without adversely affecting the protective function of the head cushion in the event of a collision.

22 Claims, 2 Drawing Sheets

HEADREST FOR A VEHICLE SEAT

BACKGROUND AND SUMMARY OF THE INVENTION

The invention relates to a headrest for a vehicle seat which is pivotally supported and which has a collision activated adjusting device which moves the head rest to support the back of the head and neck of a vehicle passenger.

In a headrest of this kind, the adjusting device for shifting the head cushion ensures that, in the event of a collision, the head cushion will be displaced forward independently of its position at that moment, in such fashion that there is only a minimal distance between the head cushion on the one hand and the cervical vertebrae and back of the seat occupant's head on the other, so that at the moment the vehicle rear strikes an obstacle and the seat occupant experiences an extreme acceleration toward the rear of the vehicle, good support is ensured for the head and cervical vertebrae of the seat occupant.

In a known headrest of this kind (German Patent Document DE 39 00 495 A1) a separate cushion part with a cushion-supporting part and partial upholstery is integrated into the head cushion and is flush with the latter, with the adjusting device being activatable by an acceleration sensor engaging the cushion-supporting part of said cushion part. In the event of a collision, the separate head cushion part is displaced forward into a supporting position for the head and neck of the seat occupant and is locked in this supporting position. The lever mechanism of the adjusting device provided for the purpose, with a pretensioned drive spring and cylinder with displaceable piston, is very complex in design and entails significant manufacturing costs.

In a likewise known headrest of the general type referred to above (U.S. Pat. No. 4,720,146), the cushion support is pivotably mounted on the supporting loop in the upper part of the head cushion and an airbag is installed between the supporting loop and the cushion support, said airbag being abruptly inflated in the event of a collision and as a result pivoting the head cushion forward primarily in its lower area, so that it comes closer to the cervical vertebrae of the seat occupant. A stop on the support loop, which the cushion support strikes as it pivots forward, ensures the correct location of the head cushion with respect to the head and neck of the seat occupant in the end position.

An object of the invention, in a headrest of the general type referred to above with occupant protection by supporting the cervical vertebrae in the event of a collision, is to improve by simple means the comfort of the head support when the vehicle is in motion or at rest by making provision for individual adaptation of the headrest contour to the requirements of the seat occupant.

This object is achieved in a headrest of the above-noted general type by providing an arrangement wherein a manual operating member is connected with the adjusting device to accommodate manual adjustment of the position of the head cushion of the head rest.

The headrest according to the invention has the advantage that the head cushion adjusting device provided in the event of a collision is also used for individual adjustment of the head cushion position by the seat occupant. The adjusting device is modified by a few structural elements in such fashion that the headrest, independently of its forward displacement in the event of a collision, can have its adjusted position changed by a manual operating member to suit the wishes of the seat occupant. This ensures that the protective function of the head cushion in the event of a collision remains unaffected and the head cushion therefore fits snugly with minimum clearance to the back of the head and the cervical lordosis (forward curvature of the lumbar spine) or nape of the neck of the seat occupant. The headrest according to the invention offers important advantages for the passenger in particular, since the latter, if he wants to relax during the ride, can adjust the headrest so that his head finds a resting position that is optimal and comfortable for him.

According to one preferred embodiment of the invention, the headrest together with its cushion support is rotatably mounted on a transverse axis mounted between mounting rods of a supporting loop and so designed that its center of gravity lies above the transverse axis. A cushion support locking device is provided which comprises a row of teeth nonrotatably connected with the transverse axis or with the mounting rod of the support loop and extending downward into the seat, and a locking pawl mounted on the cushion support with a locking tooth that engages the row of teeth. Each tooth in the row of teeth has a gently sloping tooth flank and a steeply declining tooth flank adjoining it and facing the back of the headrest. The locking tooth likewise possesses a gently sloping tooth flank and a steeply declining tooth flank immediately adjacent thereto, said flank engaging behind the steeply declining tooth flank of one tooth in the row of teeth. The manual operating member is coupled with the locking pawl to lift the locking tooth out of the row of teeth. In the event of a collision involving a rear impact, the center of gravity of the head cushion, which is located above the rotational axis, is displaced rearward, so that the locking tooth slides stepwise over the sloping tooth flanks of the teeth in the row of teeth and drops each time behind the rear flank of each tooth. The lower part of the head cushion pivots further forward and the upholstery rotates into the cervical neck nape area of the seat occupant. When the head of the seat occupant strikes the head cushion, an event that occurs with a delay relative to the backward movement of the head cushion, after a minimum travel it encounters a cushioned support locked in place by the locking tooth of the locking pawl and is restrained by the upholstery safely and over a large portion of the entire head and neck area. The adjusting device according to the invention does not use an acceleration sensor and is also made very simple in terms of the design of its kinematics, so that it advantageously keeps the manufacturing costs of the headrest low.

For individual adjustment of the headrest according to the wishes of the seat occupant for sleeping or relaxing while the vehicle is at rest or in motion, the seat occupant can operate the manual operating member. As a result, the locking pawl is lifted out of the row of teeth and the cushion support is released for adjustment. By pressing the head against the upholstery, the head cushion can be pivoted to suit the individual positions of the seat occupant. When the correct position has been found, the locking member is released and the locking pawl forces the locking tooth back into the row of teeth. The head cushion is then locked in that position.

In alternative embodiments of the invention, the locking pawl can be tensioned by spring-elastic force in the cushion support so that the locking tooth is lifted out by elastic bending of the locking pawl or can be held rotatably on the cushion support, with a locking spring tensioning the locking pawl so that the locking tooth engages the row of teeth.

According to another embodiment of the invention, the manual operating member is designed in the form of a handle located on the underside of the head cushion and preferably concealed, said handle being coupled by a transmission element with the locking pawl. A pull rod or push rod, a cable, a Bowden cable or the like can be used as a transmission element.

According to one advantageous embodiment of the invention the cushion support is mounted pivotably on a transverse axis mounted in the upper area of the head cushion between the mounting rods of the supporting loop, and the lower part of the head cushion accommodates an inflatable airbag supported between the cushion support and the mounting rods when inflated. The airbag is connected on one side to a compressed air reservoir that opens abruptly in the event of a collision and on the other side to a filling and venting valve on a compressed air source. The manual operating member is designed as a switch for switching the filling and venting valve from a basic position that sets the connection between the compressed air source and the airbag either in a filling position or a venting position for the airbag. By means of the switch, the seat occupant can adjust the headrest to his personal needs, with the head cushion resting more firmly against the back of the head and the upper neck area of the seat occupant with its lower area of upholstery during adjustment of the valve into the "fill" position, and moving further outward from the neck area when the valve is moved to the "vent" position. In the event of a collision, the airbag is inflated completely and abruptly, whereupon a portion of the airbag emerges tubewise at the underside of the head cushion and assumes a suitable shape as it presses into the vicinity of the neck or cervical vertebrae of the seat occupant.

In order to conceal an opening that is created on the underside of the head cushion in the so-called comfort position of the head cushion in which the airbag is only partially inflated, according to one advantageous embodiment of the invention a dimensionally stable flap is located on the underside of the head cushion, said flap covering this opening area. The flap, advantageously made in two parts with an articulated connection between the two flap parts, is articulated with one flap part on the supporting loop and the other flap part on the cushion support, or is attached by means of a scored intentionally breaking or bending section. In the event of a collision, the flap is disengaged by the airbag as it inflates or is torn away from the cushion support and abuts the mounting rods of the supporting loop in order to form a supporting surface at this point for the tube-shaped part of the airbag that emerges from the head cushion.

Alternatively, according to another embodiment of the invention, a slide can be guided displaceably lengthwise on the mounting rods of the supporting loop, said slide being transferable from a basic position in which it is located inside the headrest to a displaced position in which it projects downward out of the head cushion. A collar plate is located on the slide, said plate projecting at right angles to the leading edge of the head cushion, said plate extending along the bottom of the head cushion and covering an opening that results when the airbag is partially filled by the compressed air source. In the event of a collision, the inflating airbag drives the slide downward out of the head cushion by means of this collar plate and at the same time the collar plate frees the opening to allow the tubular part of the airbag to emerge. This tubular air bag section then abuts the slide that has emerged and rests against the area of the nape of the neck of the seat occupant. In order to prevent the airbag being inflated in error by the seat occupant during the individual cushion adjustment process so that it emerges from the underside of the head cushion as it would in a collision, the airbag is divided according to one advantageous embodiment of the invention into two air chambers, with the smaller air chamber located at the top inside the head cushion being connected to the compressed air source and the larger air chamber located at the lower end of the head cushion being connected to the compressed air reservoir.

Other objects, advantages and novel features of the present invention will become apparent from the following detailed description of the invention when considered in conjunction with the accompanying drawings.

DETAILED DESCRIPTION OF THE DRAWINGS

Figure 1:
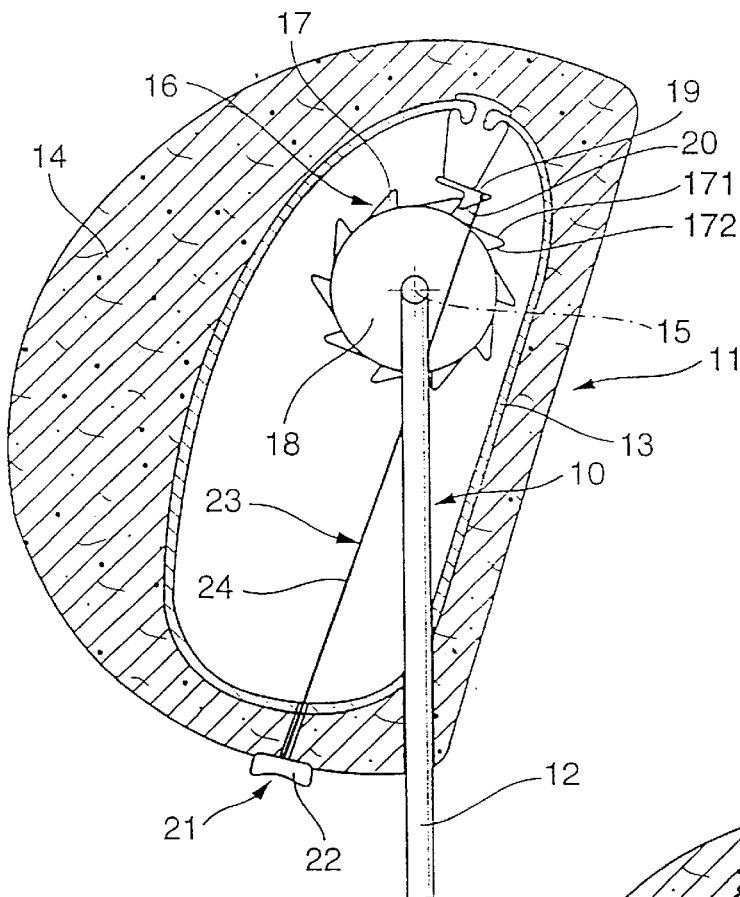
FIG. 1 is a lengthwise section through a headrest for a vehicle seat constructed according to a first preferred embodiment of the invention.

The headrest, shown schematically in FIG. 1 in a lengthwise section, has a supporting loop 10 to fasten it to the seat and a head cushion 11 that is mounted on support loop 10 so that it can pivot downward into the seat. Supporting loop 10 has two parallel mounting rods 12 connected together by a transverse rib, said rods being inserted into guide sleeves inside the backrest of the vehicle seat and guided therein, adjustable heightwise and lockable in the set height position. Head cushion 11 comprises a cushion support 13 and upholstery 14 fitted over the latter. Cushion support 13 is mounted on a transverse axis 15 mounted between mounting rods 12, with cushion support 13 and upholstery 14 being designed so that their common center of gravity lies above transverse axis 15.

An adjusting device 16 is located inside cushion support 13, said device serving firstly for individual adjustment of head cushion 11 in accordance with the wishes of the seat occupant. Secondly adjusting device 16 provides forward displacement of head cushion 11 toward the seat occupant in the event of a collision, with forward displacement being performed in such manner that regardless of the setting of the head cushion prior to a collision, during a collision the upholstery 14 of head cushion 11, with minimum clearance, abuts the back of the head and the nape of the neck of the seat occupant and largely conforms to the shape of the back of the head and the nape of the neck or cervical lordosis. The adjusting device 16 has a row of teeth 17 for this purpose, said teeth being connected nonrotatably with transverse axis 15 and/or mounting rods 12 of supporting loop 10, said row extending downward toward the seat and formed on the periphery of a circular disk 18. A locking pawl 19 is tensioned in spring-elastic fashion on cushion support 13, said pawl 19 meshing with a locking tooth 20 in row of teeth 17. Each tooth in row of teeth 17 has a gently sloping tooth flank 171 and a tooth flank 172 immediately adjacent thereto that drops steeply and faces the back of the headrest. Locking tooth 20 likewise has a gently sloping tooth flank and a tooth flank immediately adjacent thereto that declines steeply, so that when locking tooth 20 engages row of teeth 17, the steeply declining tooth flank is located immediately behind the steeply declining tooth flank 171 of a tooth in tooth row 17.

A manually operated operating member 21 is located on the underside of head cushion 11 and is coupled with locking pawl 19 to lift locking tooth 20 out of the row of teeth 17. Operating member 21 is designed in this case as a concealed handle 22 connected by a transmission element 23 with locking pawl 19. In the embodiment of the headrest according to FIG. 1, transmission element 23 is in the form of a push rod 24 but can also be made in the form of a pull rod, cable, Bowden cable, or the like with appropriate coupling to locking pawl 19.

Adjusting device 16 operates as follows:

In the event of a collision involving a rear impact, in which considerable accelerating forces act on the vehicle seat and seat occupant in the direction of the vehicle rear, because the center of gravity of head cushion 11 is located above the transverse axis, head cushion 11 executes a pivoting motion clockwise around transverse axis 15 as shown in FIG. 1, so that the lower area of head cushion 11 is displaced together with its upholstery 14 toward the seat occupant. During this pivoting motion, the gently sloping tooth flank of locking tooth 20 slides along the gently sloping tooth flank 171 of the row of teeth and after passing each tooth in tooth row 17 drops behind a steeply declining tooth flank 172. When the head of the seat occupant, because of its greater mass, strikes head cushion 11 after a delay, locking tooth 20 prevents head cushion 11 in FIG. 1 from pivoting counterclockwise as a result of its steeply declining tooth flank being located behind a steeply declining tooth flank 172 in tooth row 17, and the head of the seat occupant encounters a firmly locked head cushion 11 upon its rearwardly directed impact, with upholstery 14 of said cushion projecting into the area of the cervical vertebrae of the seat occupant as a result of the previous pivoting of head cushion 11 that causes it to assume a minimum distance from the back of the head and the nape of the neck of the seat occupant at the moment of the rearward impact of the head. The seat occupant is therefore restrained over a large area by head cushion 11 at the very beginning of the backward movement of the head, directly at the back of the head and in the area of the nape of the neck.

If the seat occupant wants to adjust the setting of the headrest while the vehicle is in motion or at rest so that he can assume a comfortable sleeping position, he need only push handle 22 into flexible upholstery 14. Transmission element 23 designed as a push rod 24 lifts locking pawl 19, tensioned in a spring-elastic manner, to the point where its locking tooth 20 is lifted out of row of teeth 17. This releases adjusting device 16 so that by pressing the head against upholstery 14, head cushion 11 can be pivoted by the seat occupant until he has found an optimum supporting position for his head and neck that corresponds to his individual wishes. After handle 22 is released, locking pawl 19 together with locking tooth 20 automatically drops into row of teeth 17 and the headrest is locked in the new position.

Figure 2:
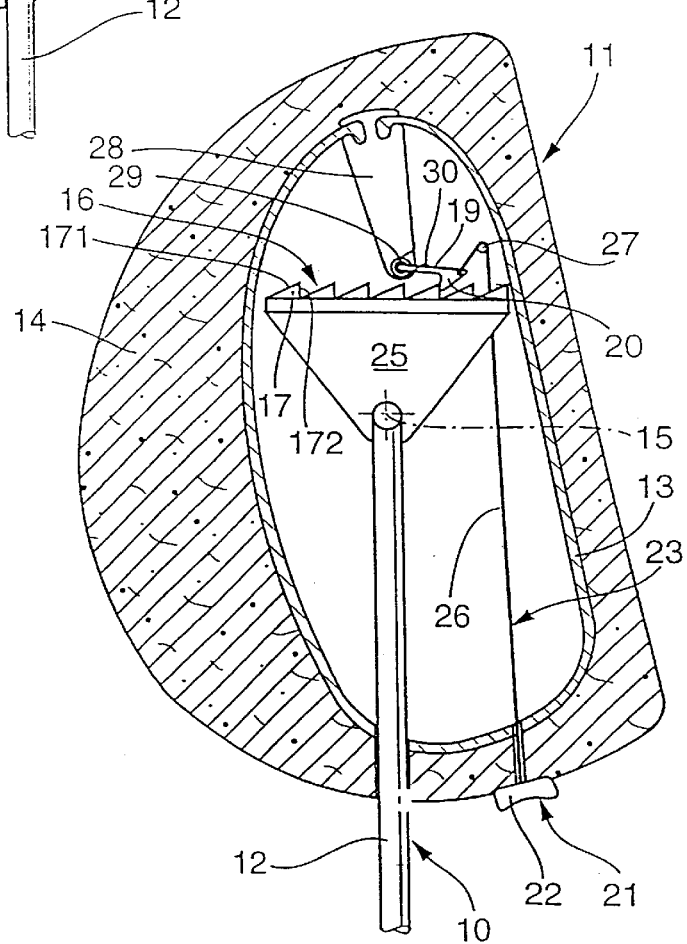
FIG. 2 is a viewing similar to FIG. 1, but showing a modified adjusting device, constructed according to another preferred embodiment of the invention.

The headrest shown schematically in FIG. 2 in a lengthwise section essentially corresponds in design to the headrest of FIG. 1 described previously so that the same components have been given the same reference numbers. It has been modified only as regards adjusting device 16, in which the row of teeth 17 extending downward into the seat is formed on a strip 25 that extends at right angles to transverse axis 15 downward into the seat and is permanently connected with transverse axis 15 or at least one of the mounting rods 12 of supporting loop 10. The operation of adjusting device 16 in the event of a collision is identical to that described above. The individual adjustment of head cushion 11 according to the wishes of the seat occupant is again performed by means of handle 22 fitted on the underside of upholstery 14 in head cushion 11. Transmission element 23, here designed as a pull cord 26 with deflecting roller 27, is connected with locking pawl 19. When handle 22 is pulled downward, locking tooth 20 of locking pawl 19 is raised out of row of the teeth 17 by pull cord 26. Locking pawl 19 is mounted pivotably on a holder 28 that is mounted on cushion support 13. Its pivot axis is labeled 29 in FIG. 2. A locking spring 30, designed for example as a rotational spring mounted on pivot axis 29, tensions locking pawl 19 in such fashion that its locking tooth 20 is held in mesh with the row of teeth 17.

Figure 3:
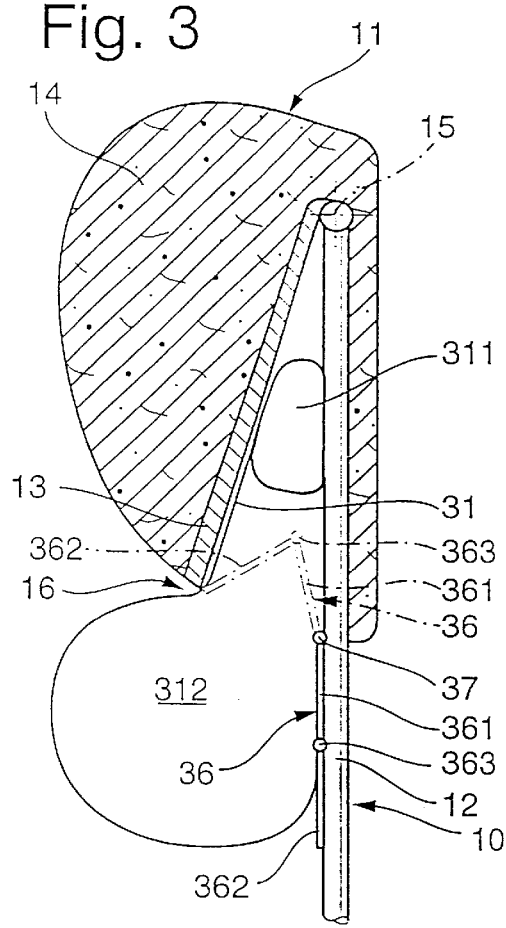
FIG. 3 is a view similar to FIGS. 1 and 2, showing a headrest constructed according to another preferred embodiment of the invention.
Figure 4:
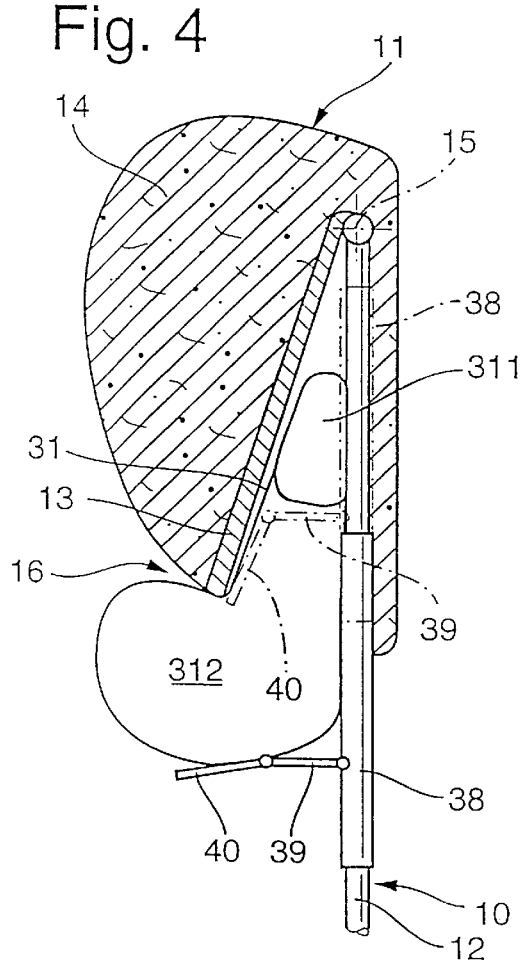
FIG. 4 is a view similar to FIG. 3, showing another, preferred embodiment of the invention with a modified covering for the underside of the head cushion.

The headrest shown schematically in a lengthwise section in FIGS. 3 and 4 similarly comprises a supporting loop 10 with mounting rods 12 and head cushion 11 with cushion support 13 and upholstery 14. Cushion support 13 is pivotably mounted on a transverse axis 15 that is mounted in the upper area of head cushion 11 between mounting rods 12 of supporting loop 10. In the lower part of head cushion 11, an inflatable airbag 31 is provided which, when inflated, lodges between cushion support 13 and supporting loop 10, more specifically, its mounting rods 12. As a result, as shown in FIG. 3, the lower area of upholstery 14 of headrest 11 is displaced forward toward the back of the head and nape of the neck of the seat occupant.

Figure 5:
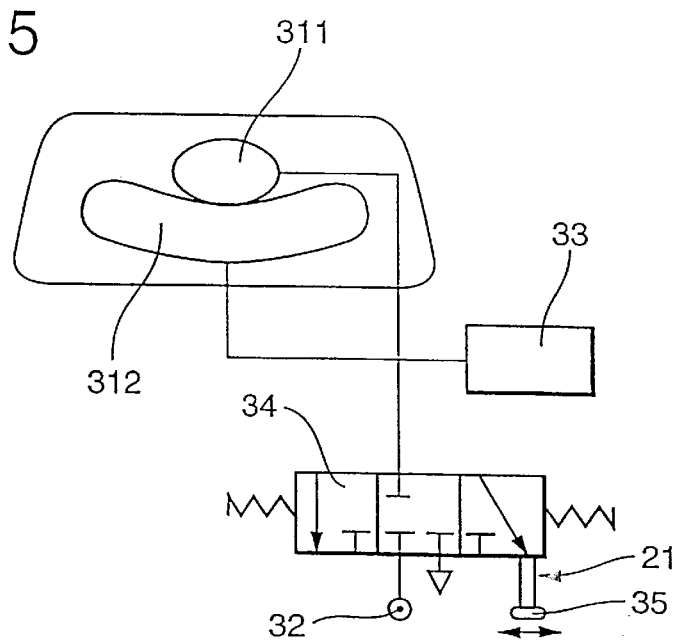
FIG. 5 is a circuit diagram schematically showing the compressed air supply to the headrests shown in FIGS. 3 and 4.

As shown schematically in FIGS. 3 and 5, airbag 31 is divided into two air chambers 311 and 312, located one above the other. The smaller air chamber 311, located at the top inside head cushion 11, is connected to a compressed air source 32 and the larger air chamber 312 located at the bottom end of head cushion 11 is connected to a compressed air reservoir 33. Smaller air chamber 311 is connected to compressed air source 32 by an inflation and venting valve 34, here designed in the form of a 3/3-way valve with spring return, that separates air chamber 311 from compressed air source 32 in its basic position, and in its filling position connects the chamber with compressed air source 32 and in its venting position connects the chamber with an air outlet.

The shifting of 3/3-way valve 43 into its filling and venting positions is accomplished with a slide switch 35 that constitutes manual operating member 21 for adjusting the head cushion position to suit the individual wishes of the seat occupant. When slide switch 35 is actuated, air is either admitted to air chamber 311 or vented from air chamber 311, thus changing the adjustment of head cushion 11. When slide switch 35 is released, 3/3-way valve 34 automatically returns to its basic position and the adjustment process is therefore interrupted.

Compressed air reservoir 33 is designed so that in the event of a collision, it empties its air volume abruptly into larger air chamber 312, causing airbag 31 to inflate abruptly. Airbag 31 has a size and shape such that it emerges at the underside of head cushion 11 and, while simultaneously abutting mounting rods 12 of supporting loop 10, extends tubewise into the cervical neck area of the seat occupant, as shown in FIG. 3. Pressurization of compressed air reservoir 33 is actuated in the event of a collision by an acceleration sensor, not shown here, which in the event of a collision involving a rear impact senses an acceleration acting in the rearward direction and opens compressed air reservoir 33. In a manner similar to that described with reference to FIG. 1, cushion support 13 together with upholstery 14 pivots away from supporting loop 10 toward the seat occupant in a collision, whereupon the air tube of airbag 31 that emerges at the underside is applied to the area of the back of the neck of the seat occupant until only a minimum clearance remains. The seat occupant's head, as it moves backward, is then caught after minimum rearward travel by airbag 31 in the area of the nape of the neck and by upholstery 14 in the vicinity of the back of the head over a large area and protected against injury.

As already mentioned, the seat occupant can adjust headrest 11 for sleeping or relaxing in the passenger seat by actuating slide switch 35 appropriately. Then airbag 31 is inflated or vented only in the area of air chamber 311, as shown in FIG. 3, so that cushion support 13 with upholstery 14 pivots to a greater or lesser degree away from supporting loop 10. Since air chamber 312 has not been filled, airbag 31 remains inside head cushion 11 and does not emerge from the latter.

In order to conceal from sight the opening on the underside of head cushion 11 that results when head cushion 11 pivots away from supporting loop 10, a dimensionally stable flap 36 that covers the opening is located on the underside of head cushion 11 between cushion support 13 and mounting rods 12, as indicated by the dot-dashed lines in FIG. 3. Flap 36 is made in two parts, with the two flat parts 361, 362 being pivotably linked with one another by a joint 363. Flap part 361 is articulated at its edge away from the joint to the two mounting rods 12 in a pivotably movable fashion. The pivot axis is marked 37 in FIG. 3. The other flap part 362 is secured by its edge away from the joint in cushion support 13 or mounted on cushion support 13 by a scored section. When airbag 31 is inflated in the event of a collision as a result of sudden filling of larger chamber 312, flap 36 is disengaged from cushion support 13 or is torn away from the latter and pivoted downward, with the two flap parts 361, 362 fitting flush against mounting rods 12 and forming at this point, as shown in FIG. 3, a supporting surface for the air tube of airbag 31 that emerges from head cushion 11.

In contrast to the headrest according to FIG. 3, in the headrest shown in FIG. 4 that has a similar design and function, a slide 38 is provided that is displaceably guided on the two mounting rods 12. In its basic position, slide 38 is located completely inside the outlines of head cushion 11 and can be displaced downward out of head cushion 11. A collar plate 39 is mounted on slide 38, said plate projecting forward at right angles toward the front of head cushion 11, on which plate a diaphragm 40 may be articulated. Collar plate 39 and diaphragm 40 are so designed that they completely cover the opening formed on the underside when airbag 31 is inflated as a result of the inflation of air chamber 311. When air chamber 312 is inflated by compressed air reservoir 33 in the event of a collision, airbag 31 pushes against collar plate 39 as it inflates and displaces carriage 38 downward out of head cushion 11 into the end position shown by the solid lines in FIG. 4. As described above, airbag 31 extends an air tube through the opening left by collar plate 39 with diaphragm 40 at the underside of head cushion 11, fills the cervical neck area of the seat occupant, and abuts slide 38.

The invention is not limited to the embodiments described above. In particular, adjusting device 16 described in FIGS. 3–5 can also be used on a so-called integral seat, in which the headrest is molded directly onto the seat back. In this case the supporting loop is formed by an elongate part of the backrest and the head cushion, integrally connected with the elongate part, has in its upper area a certain freedom to pivot with respect to the backrest so that its lower area can pivot forward toward the nape of the neck of the seated person. The airbag, as in the embodiments in FIGS. 3–5, is located between the head cushion and the elongate part of the backrest and in the event of a collision, emerges tubewise at the underside of the head cushion in order to insert itself into the vicinity of the nape of the neck of the seat occupant.

Of course not only compressed air but any environmentally acceptable gas can be used to fill airbag 31.

Airbag 31 shown in FIGS. 3 and 4, equipped with two separate air chambers 311 and 312, can also be made as a single-chamber airbag. In this case, the compressed air supply shown in FIG. 5 must be adapted accordingly. Consequently, a single compressed air line leads to the single-chamber airbag. The compressed air line is connected directly on one side to compressed air reservoir 33 and on the other side to a control valve comparable to the 3/3-way valve through a check valve whose blocking direction is directed toward the control valve. The control valve is operated by pneumatic control inputs and a manually operated pneumatic switch is located between compressed air source 32 and the control valve.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Headrest for a vehicle seat with a supporting loop that has two parallel mounting rods for insertion into guide sleeves in the seat, with a head cushion mounted so that it can pivot on the supporting loop about a pivot axis located in an upper portion of the head rest with respect to a seat bottom, said cushion having a cushion support and upholstery fitted over the latter, and with an adjusting device operable in response to collision induced inertial forces to pivotally displace the head cushion relative to the supporting loop whereby the head cushion is moved forwardly for directly abutting a seat occupant in a nape of the neck and the back of the head, wherein the adjusting device is operably connected between the headrest and the seat and includes a manually operated member for accommodating changing pivotal adjustment of the head cushion to respective comfortable seat occupant head supporting positions during normal driving.

2. Headrest according to claim 1, wherein the head cushion is mounted rotatably by its cushion support on a transverse axis located between mounting rods of the supporting loop, wherein the head cushion is designed so that its center of gravity is located above the transverse axis, wherein the adjusting device includes a locking device which comprises a row of teeth connected nonrotatably with one of the transverse axis and the mounting rods of the supporting loop, said row of teeth extending toward the bottom of the seat, and a locking pawl mounted on the cushion support with a locking tooth engaging the row of teeth, wherein every tooth in the row of teeth has a gently sloping tooth flank and a steeply declining tooth flank located immediately adjacent thereto and facing the back of the head cushion, wherein the locking tooth has a gently sloping tooth flank and a steeply declining tooth flank immediately adjacent thereto, said flank engaging behind the steeply declining tooth flank of a tooth in the row of teeth, and wherein the manual operating member is coupled with the locking pawl to raise the locking tooth out of the row of teeth.

3. Headrest according to claim 2, wherein the locking pawl is tensioned in a spring-elastic manner on the cushion support.

4. Headrest according to claim 2, wherein the locking pawl is mounted rotatably on the cushion support, and wherein a locking spring that tensions the locking pawl causes the locking tooth to engage the row of teeth.

5. Headrest according to claim 4, wherein the manual operating member is designed as a handle connected with a transmission element, formed as one of a pull rod, a push rod, a cable, and a Bowden cable.

6. Headrest according to claim 2, wherein the row of teeth is provided on the periphery of one of a circular disk, a disk in the form of a segment of a circle, and a strip extending at right angles to the transverse axis.

7. Headrest according to claim 6, wherein the manual operating member is designed as a handle connected with a transmission element, formed as one of a pull rod, a push rod, a cable, and a Bowden cable.

8. Headrest according to claim 2, wherein the manual operating member is designed as a handle connected with a transmission element, formed as one of a pull rod, a push rod, a cable, and a Bowden cable.

9. Headrest according to claim 1, wherein the cushion support is mounted pivotably on a transverse axis mounted in an upper area of the head cushion between mounting rods of a supporting member, wherein an inflatable airbag that lodges between the cushion support and the mounting rods when inflated is located in a lower area of the head cushion, wherein the airbag is connected on one side to a compressed air reservoir that empties abruptly in the event of a collision and on the other side by a filling and venting valve to a compressed air source, and wherein the operating member is designed as a switch for switching the filling and venting valve from its basic position in which it blocks a connection between the compressed air source and the airbag into a venting position for venting the airbag.

10. Headrest according to claim 9, wherein the airbag is of a size and shape such that upon inflation in the event of a collision it emerges at an underside of the head cushion and extends tubewise into the nape of the neck area of the seat occupant.

11. Headrest according to claim 10, wherein a dimensionally stable flap is located on an underside of the head cushion between the cushion support and the mounting rods of the supporting loop, said flap, in an airbag that is partially filled by the compressed air source, filling the area between the mounting rods and the cushion support and being so designed that it is disengaged or torn free by the airbag when inflated by the compressed air reservoir in a collision, and abuts the mounting rods as a supporting surface for the tubular part of the airbag that emerges from the head cushion.

12. Headrest according to claim 11, wherein the flap is made in two parts with a joint that connects the two flap parts, and wherein one flap part is mounted in a pivotably movable fashion with its edge remote from the joint on the supporting loop and the other flap part is releasably mounted on the underside of the cushion support.

13. Headrest according to claim 12, wherein the airbag is divided into two different size air chambers, and wherein the smaller air chamber is located at the top inside the head cushion and is connected to the compressed air source and the larger air chamber is located at a lower end of the head cushion and is connected to the compressed air reservoir.

14. Headrest according to claim 11, wherein the airbag is divided into two different size air chambers, and wherein the smaller air chamber is located at the top inside the head cushion and is connected to the compressed air source and the larger air chamber is located at a lower end of the head cushion and is connected to the compressed air reservoir.

15. Headrest according to claim 10, wherein a slide is guided displaceably lengthwise on the mounting rods of the supporting loop, said slide being transferable from a basic position in which it is located inside the head cushion into a displaced position in which it projects downward out of the head cushion, and wherein a collar plate that projects forward at right angles to a leading edge of the head cushion is located on the slide, said plate, when the airbag is partially filled by the compressed air source, covering a resulting opening on the underside of the head cushion and also forming a force-accepting surface for displacement of the slide by the airbag that inflates in the event of a collision.

16. Headrest according to claim 15, wherein the airbag is divided into two different size air chambers, and wherein the smaller air chamber is located at the top inside the head cushion and is connected to the compressed air source and the larger air chamber is located at a lower end of the head cushion and is connected to the compressed air reservoir.

17. Headrest according to claim 10, wherein the airbag is divided into two different size air chambers, and wherein the smaller air chamber is located at the top inside the head cushion and is connected to the compressed air source and the larger air chamber is located at a lower end of the head cushion and is connected to the compressed air reservoir.

18. Headrest according to claim 9, wherein the airbag is divided into two different size air chambers, wherein the smaller air chamber is located at the top inside the head cushion and is connected to the compressed air source and the larger air chamber is located at a lower end of the head cushion and is connected to the compressed air reservoir.

19. A vehicle headrest assembly comprising:

a pivotally mounted cushion support which in use is forwardly disposed behind a vehicle occupant's head for supporting said head during normal driving operations and pivots about a pivot axis located on an upper portion of the headrest, cushioning upholstery fitted over the cushion support, a collision responsive adjusting device for automatically pivotally moving the cushion support to a position where the cushioning upholstery is more closely adjacent a head and nape of a neck of a seat occupant in response to collision induced inertial forces, and a manually operable operating member engageable with an adjusting support and operably connected to the headrest for selectively changing the pivotal position of the cushion support and cushioning upholstery for improving occupant head support comfort during normal driving operations, whereby the adjusting support provided for the event of a collision and operably connected to the headrest is also used for selective adjustment of the position of the cushion upholstery.

20. An assembly according to claim 19, wherein the collision responsive adjusting support includes relatively movable toothed members, and wherein the manually operable operating member is disposed to disengage the toothed members to accommodate pivoting adjusting movement of the cushion support.

21. As assembly according to claim 19, wherein said adjusting support includes an airbag which is selectively inflatable and ventable in response to movement of the operating member.

22. A vehicle headrest assembly comprising:

a cushion support with cushioning upholstery fitted thereover which in use is forwardly disposed behind a vehicle occupant's head for supporting said head during normal driving operations, pivotal mounting means located on an upper portion of the headrest for accommodating pivotal movement of the cushion support about a pivot axis, collision responsive adjusting support means for automatically pivoting the cushion support toward a position where the cushioning upholstery is moved to a position further supporting a nape of the neck and back of the head of an occupant in response to rear end collision induced inertial forces, and manually operable adjusting means engageable with the adjusting support means and operably connected to the headrest to accommodate selective occupant adjustment of the pivotal position of the cushion support for improving occupant head cushion support during normal driving operations without adversely affecting operation of the collision response adjusting support means.

\* \* \* \* \*